United States Patent
Aelion et al.

(10) Patent No.: US 9,310,872 B2
(45) Date of Patent: Apr. 12, 2016

(54) PROCESSOR FREQUENCY MAINLY DEPENDING ON A TARGET FRAME RATE WHILE PROCESSING A GRAPHICS APPLICATION

(71) Applicant: Nvidia Corporation, Santa Clara, CA (US)

(72) Inventors: Ilan Aelion, Fort Collins, CO (US); Aleksandr Frid, Santa Clara, CA (US); Satya Popuri, Santa Clara, CA (US)

(73) Assignee: NVIDIA CORPORATION, Santa Clara, CA (US)

( * ) Notice: Subject to any disclaimer, the term of this patent is extended or adjusted under 35 U.S.C. 154(b) by 388 days.

(21) Appl. No.: 13/756,654

(22) Filed: Feb. 1, 2013

(65) Prior Publication Data
US 2014/0223219 A1    Aug. 7, 2014

(51) Int. Cl.
*G06F 1/32* (2006.01)
*G06F 1/04* (2006.01)

(52) U.S. Cl.
CPC ............... *G06F 1/3218* (2013.01); *G06F 1/04* (2013.01); *G06F 1/324* (2013.01); *G06F 1/3206* (2013.01); *Y02B 60/1217* (2013.01)

(58) Field of Classification Search
CPC ..... G06F 1/3265; G06F 1/3203; G06F 1/329; G06F 1/3818
USPC ......................................... 713/323, 322, 600
See application file for complete search history.

(56) References Cited

U.S. PATENT DOCUMENTS

| | | | |
|---|---|---|---|
| 6,535,238 B1 * | 3/2003 | Kressin | 348/14.01 |
| 8,102,398 B2 * | 1/2012 | Bajic et al. | 345/503 |
| 8,291,460 B1 * | 10/2012 | Peacock | 725/93 |
| 8,572,421 B2 * | 10/2013 | de Cesare | G06F 9/4893 345/501 |
| 2003/0233592 A1 * | 12/2003 | Lin | G06F 1/3228 713/320 |
| 2004/0205757 A1 * | 10/2004 | Pering | 718/102 |
| 2005/0223249 A1 * | 10/2005 | Samson | G06F 1/3228 713/320 |
| 2007/0028128 A1 * | 2/2007 | Ping | 713/320 |
| 2007/0206018 A1 * | 9/2007 | Bajic | G06F 1/3225 345/501 |
| 2009/0112931 A1 * | 4/2009 | Wang et al. | 707/104.1 |
| 2009/0135918 A1 * | 5/2009 | Mak-Fan | H04N 21/41407 375/240.28 |
| 2009/0244091 A1 * | 10/2009 | Horio et al. | 345/619 |
| 2011/0097059 A1 * | 4/2011 | Sekiguchi et al. | 386/343 |
| 2011/0109624 A1 * | 5/2011 | Greenberg et al. | 345/419 |
| 2012/0081377 A1 * | 4/2012 | Sowerby et al. | 345/522 |
| 2013/0050062 A1 * | 2/2013 | Kim et al. | 345/1.3 |
| 2013/0111241 A1 * | 5/2013 | Ha | H04W 52/029 713/322 |
| 2014/0095718 A1 * | 4/2014 | Daly et al. | 709/226 |
| 2014/0204101 A1 * | 7/2014 | Ramadoss et al. | 345/522 |

* cited by examiner

*Primary Examiner* — Thomas Lee
*Assistant Examiner* — Santosh R Poudel

(57) ABSTRACT

A clock frequency controller for a processor and a method of operation thereof. The clock frequency controller may be embodied in a processor, including: (1) a processing core operable at a clock frequency to undertake a processing of a graphics application, and (2) a clock frequency controller coupled to the processing core and operable to adjust the clock frequency based on a current frame rate of the processing and a target frame rate for the processing.

15 Claims, 3 Drawing Sheets

PROCESSOR FREQUENCY MAINLY DEPENDING ON A TARGET FRAME RATE WHILE PROCESSING A GRAPHICS APPLICATION

TECHNICAL FIELD

This application is directed, in general, to processors and, more specifically, to a clock frequency controller for a processor and a method of operating the same.

BACKGROUND

Computing systems are often designed around a fine balance of power consumption and performance. Demand for ever-higher computing performance continues to outpace the power availability of modern systems. Many modern computing systems are categorized as mobile and rely on battery power. These include laptop computers, tablets and cellphones. Significant achievements have been made in battery technology yielding smaller, more efficient, and often reusable cells. However, processing demands, driven by high-bandwidth software applications and high-fidelity graphics rendering, too often negate those achievements. High-performance computing systems can drain the most advanced battery in a relatively brief period of time.

Power efficiency has become a hallmark of computing system design, driving advances in energy efficient communication protocols, displays and processing. Wireless communication networks rely heavily on a robust electrical grid and battery technology to power high frequency antennas, transmitters and receivers. Display technology has evolved from simple mono-color liquid crystal displays (LCDs), to multi-color LCDs, to touchscreens and light emitting diode (LED) displays. Processing speed, a basic measure of microprocessor performance, is restrained by a system's ability to power high performance processors and to dissipate the heat generated by such components. High-speed processors perform more operations per second, demanding more energy and generating more heat than slower alternatives. Heat may be dissipated by mechanisms as simple as cooling fans and heat sinks; or as elaborate as liquid cooling systems. More often than not, cooling systems demand even more power from the system. These consequences combine effectively to tamp down microprocessor performance in the name of reduced power consumption.

Power management features appear on many computing devices, aiding in striking the balance of power efficiency and performance. Such features include powering down idle connections, displays and even processes, conserving energy for peak usage periods. Another example is to dynamically scale the clock frequency of a microprocessor, or central processing unit (CPU). Dynamic frequency scaling, or "CPU throttling," allows a computing system to adjust the speed of a microprocessor to meet the operational processing demand of a current processing load. Under high processing load, the clock frequency may be scaled up allowing the computing system to execute more operations per second and to consume more power. Likewise, under low processing load, the clock frequency may be scaled down to conserve power as there are more available clock cycles than there are operations to execute. In other words, in a period of time when the processor is under-loaded, there are "wasted" clock cycles.

CPU processing load is a valuable measure of a computing system's performance. If a system is over-loaded, the processing load exceeds the processing bandwidth of the system's processing cores. Dynamic frequency scaling based on processing load allows the system to recognize the processing load and scale up the processor speed (or speeds in a multi-core system), thereby broadening the processing bandwidth of the system. Conversely, the processing bandwidth is tightened under low processing load conditions.

As more computing systems have become restrained by power availability, dynamic frequency scaling has become more prevalent. Monitoring processing loads on microprocessors has been the lynchpin in understanding and appropriately scaling processor speeds yielding the power efficiency necessary to meet the high performance demands on modern computing systems.

SUMMARY

One aspect provides a processor, including (1) a processing core operable at a clock frequency to undertake a processing of a graphics application, and (2) a clock frequency controller coupled to the processing core and operable to adjust the clock frequency based on a current frame rate of the processing and a target frame rate for the processing.

Another aspect provides a method of scaling a clock frequency of a processing core processing a graphics application, including: (1) determining a current frame rate, and (2) scaling up the clock frequency if the current frame rate is below a target frame rate.

Yet another aspect provides a computing system operable to execute an application for generating graphics at a target frame rate, including: (1) a display device operable to display the graphics at a current frame rate, (2) a display controller configured to determine the current frame rate, and (3) a variable frequency processor couplable to the display controller and including: (3a) a processing core operable at a clock frequency to undertake a processing of the application, and (3b) a clock frequency controller associated with the processing core and operable to adjust the clock frequency based on a current frame rate of the processing and a target frame rate for the processing.

BRIEF DESCRIPTION

Reference is now made to the following descriptions taken in conjunction with the accompanying drawings, in which.

DETAILED DESCRIPTION

Figure 1:
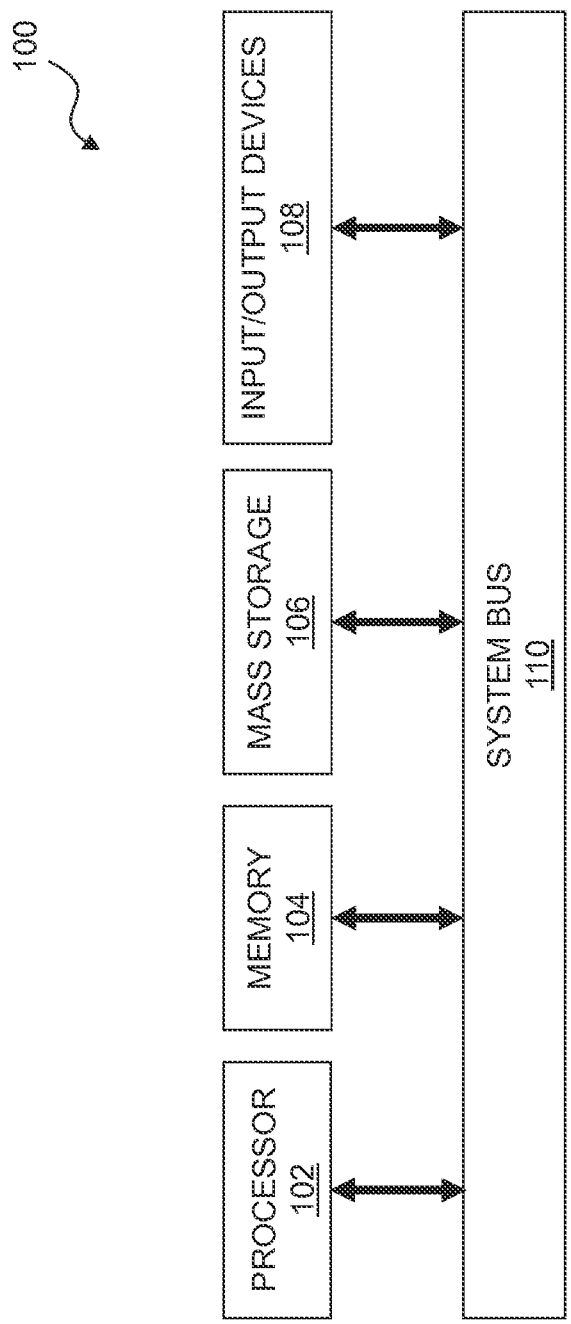
FIG. 1 is a block diagram of one embodiment of a computing system within which a clock frequency controller or a method of scaling clock frequency may be contained or carried out.

It is realized herein that dynamic microprocessor clock frequency scaling is more effective when more tightly coupled to a perceptible output of the host computing system, more specifically, the frame rate at which graphics are rendered and later displayed. The conventional approach of employing the current processing load to decide whether the clock frequency should be scaled up or down is a degree removed from a dominating element of the processing load: graphics rendering. It is realized herein the rate at which graphics are rendered in a computing system, or simply the "frame rate," is an invaluable metric having a useful and exploitable correlation with the power demands of the microprocessor. It is further realized herein that target frame rates are real, ascertainable numbers that are often related to display hardware (vertical synchronization or refresh rates), user settings or profiles, application settings or system configuration. A computing system's failure to meet a target frame rate is a perceptible shortcoming and therefore, graphics rendering is generally given priority over system processing resources, if resources are not dedicated entirely.

Although graphics rendering is a dominant component of the system processing load, it is rarely the only component. It is realized herein that of the system processing load components, graphics rendering is one of few large sustained processing loads. It is also realized herein, for many mobile computing systems, the processing load is focused on a single active application, and mobile applications are often relatively graphics intensive. More generally, in many more computing systems, graphics rendering often dominates the processing load in a given instant as well as over time. It is further realized herein this correlation makes a system's frame rate a well suited metric for driving dynamic clock frequency scaling. It is also realized herein the frame rate can be used in conjunction with the conventional processing load metric to make a two stage scaling decision.

It is realized herein significant power savings may be had by scaling down or maintaining current clock frequency when the current frame rate either meets or exceeds the target frame rate. Conversely, clock frequency is scaled up when the target frame rate is not being met. It is realized herein that conventional dynamic clock frequency scaling employing processing load as the determinative factor would needlessly scale up the clock frequency when the processing load is near, at or above the sustained load limit, although the target frame rate is being met. The processing load falls accordingly, but no further perceptible objective of the system or the application being executed on the system is being achieved. The processor is simply running faster, consuming more power and generating more heat. The clock frequency controller and method of clock frequency scaling introduced herein resolve such inefficiencies by employing frame rate, which is a more precise measure of computing system performance and tends to yield a more power efficient dynamic clock frequency scaling regime.

Before describing various embodiments of the clock frequency controller and method of frequency scaling introduced herein, one example of a computing system within which the clock frequency controller or method of clock frequency scaling may be embodied or carried out will be described.

FIG. 1 is a block diagram of one embodiment of a computing system 100 within which a clock frequency controller or a method of scaling clock frequency may be contained or carried out. Computing system 100 includes a processor 102, a memory 104, mass storage 106 and input/output devices 108, all coupled to a system bus 110.

Input/output devices 108 may be a variety of peripheral devices coupled to computing system 100. Common devices include: displays, a keyboard, a mouse, a trackball, a printer, a scanner, speakers and others. Input/output devices 108 are mechanisms of data entry and retrieval from computing system 100.

Processor 102 carries out a number of operations per second according to instructions embedded in a program in memory 104. Access to those instructions is had through system bus 110. Operations carried out by processor 102 are performed on input data stored in memory 104 and yielding output data also stored in memory 104. In certain embodiments, memory 104 is random access memory, or RAM. In the embodiment of FIG. 1, input and output data flows from memory 104 to processor 102 via system bus 110. Input and output data may originate from a variety of sources, including other programs, mass storage 106 or input/output devices 108.

Mass storage 106 is a large memory block external with respect to the computing system. In certain embodiments, memory 104 may be local to a circuit board on which processor 102 resides, while mass storage 106 is remotely coupled via a communication bus. Mass storage 106 may be virtually any form of high capacity memory, including: solid state or "flash" memory, tape, magnetic disks, platters and many other electro-mechanical storage types. The communication buses sufficient to couple mass storage to system bus 110 and thus computing system 100 include: universal serial bus (USB), serial advanced technology attachment (SATA), small computer system interface (SCSI), FireWire®, peripheral controller interface (PCI®), PCI Express®, Ethernet, Infiniband® and other high speed buses. Mass storage 106 is often used as a storage location for processed data that is remote to the data currently being processed by processor 102. For example, if computing system 100 were to be rendering an image, the final product, i.e., the image, would likely be stored in mass storage 106. Memory 104 is generally reserved for short term, temporary or otherwise volatile data immediately necessary to processes and operations carried out by processor 102.

Having described one example of a computing system within which the clock frequency controller or method of clock frequency scaling may be embodied or carried out, various embodiments of the clock frequency controller and method of clock frequency scaling will be described.

Figure 2:
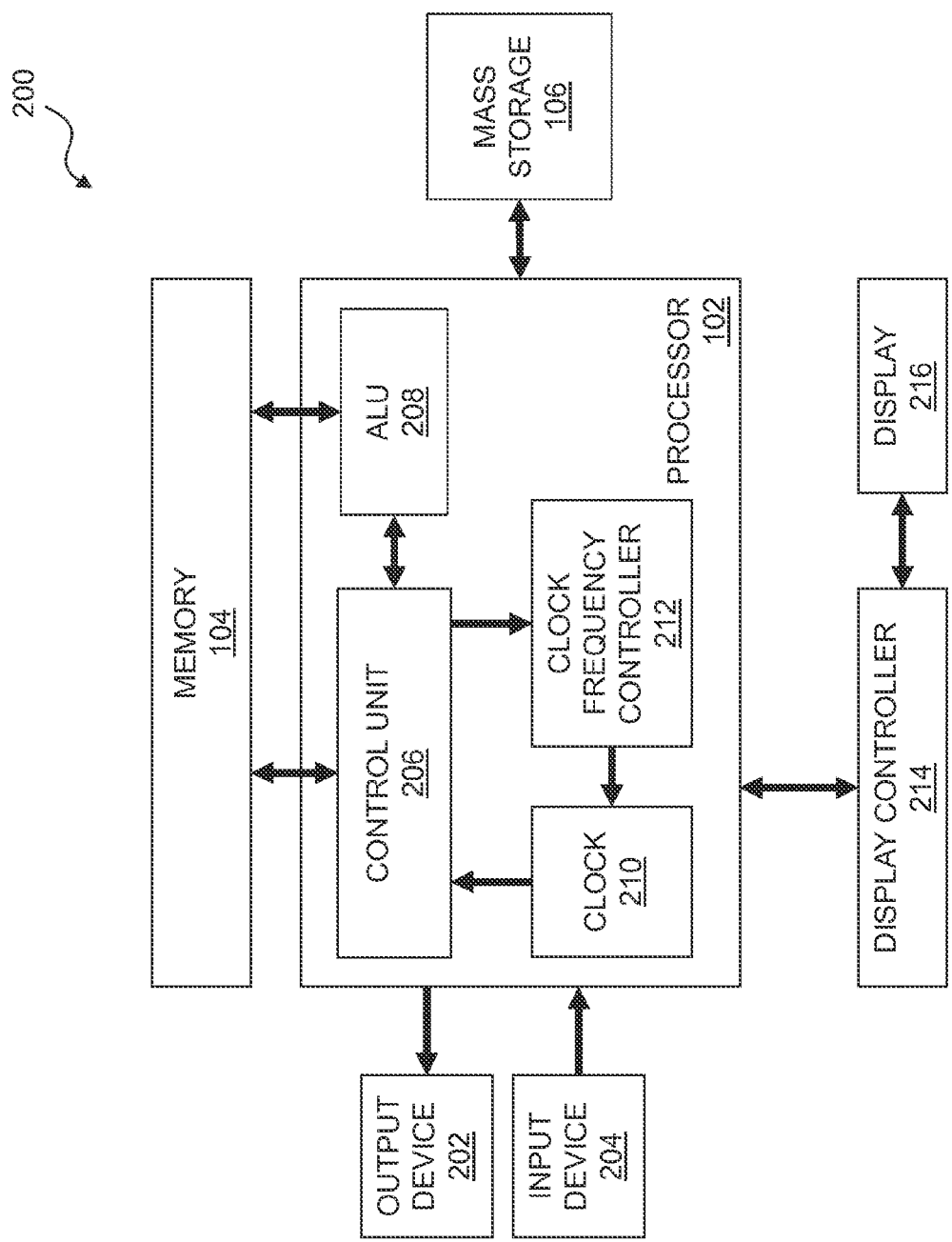
FIG. 2 is a block diagram of one embodiment of a computing system containing a clock frequency controller for a processor.

FIG. 2 is a block diagram of one embodiment of a computing system 200 containing processor 102 of FIG. 1 coupled to memory 104, mass storage 106, also of FIG. 1. Processor 102 is also coupled to a display controller 214, and consequently a display 216, an output device 202 and an input device 204. Output device 202 may be one of several of input/output devices 108 of FIG. 1, including a display, printer or speaker. Input device 204 may also be one of several of input/output devices 108 of FIG. 1, including a keyboard, mouse or scanner. Alternate embodiments may employ a variety of other devices as output device 202 and input device 204.

Display 216 is configured to display a sequence of computer graphics images generated by executing a graphics application on processor 102. Display 216 is operable to display a single image, or frame, in a given instant. Each time the displayed image is updated to the next in the sequence of images is a refresh cycle. The rate at which display 216 displays images is the refresh rate. Most displays have a stated refresh rate above which the display cannot operate. As the graphics application is executed in processor 102, graphics are rendered at a frame rate, effectively representing the speed at which graphics are rendered. Rendered graphics are passed along to display 216 through display controller 214. In certain embodiments display controller 214 carries out rendering operations based on data and instructions obtained from processor 102 and memory 104.

Processor 102 contains a control unit 206, an arithmetic logic unit (ALU) 208, a clock 210 and a clock frequency controller 212. Memory 104 is coupled to control unit 206 and ALU 208, allowing control unit 206 to gain access to instructions and direct ALU 208 to memory locations containing data to be operated on according to those instructions. Clock 210 operates at a clock frequency and dictates the number of operations carried out by processor 102 per second via a coupling of clock 210 to control unit 206. The clock frequency of clock 210 is scalable during operation, otherwise known as dynamically scalable. Certain embodiments of clock 210 have at least an upper frequency limit that represents a maximum number of operations processor 102 may carry out per second. Other embodiments may also have a lower frequency limit.

In the embodiment of FIG. 2, a target frame rate is specified and is known by clock frequency controller 212. Display controller 214 tracks the times at which each frame is displayed on display 216 in addition to a target time. Over the course of two or more refresh cycles, the frame rate at which images are displayed on display 216, or "current frame rate," is determinable by either display controller 214 or in certain embodiments, clock frequency controller 212. The current frame rate is compared to the target frame rate by clock frequency controller 212 and a decision is made as to whether the clock frequency of clock 210 should be increased, maintained or decreased. If the current frame rate determined via display controller 214 is below the target frame rate, clock frequency controller 212 increases, or scales up, the clock frequency of clock 210 to increase the processing rate of processor 102 and ultimately the current frame rate. If the current frame rate is at or above the target frame rate, clock frequency controller 212 may reduce the clock frequency of clock 210 so that fewer clock cycles are wasted and the target frame rate can still be met. Clock 210 is configured to then modify a clock signal according to the new clock frequency and transmit the clock signal such that control unit 206 carries out operations at the appropriate speed.

Figure 3:
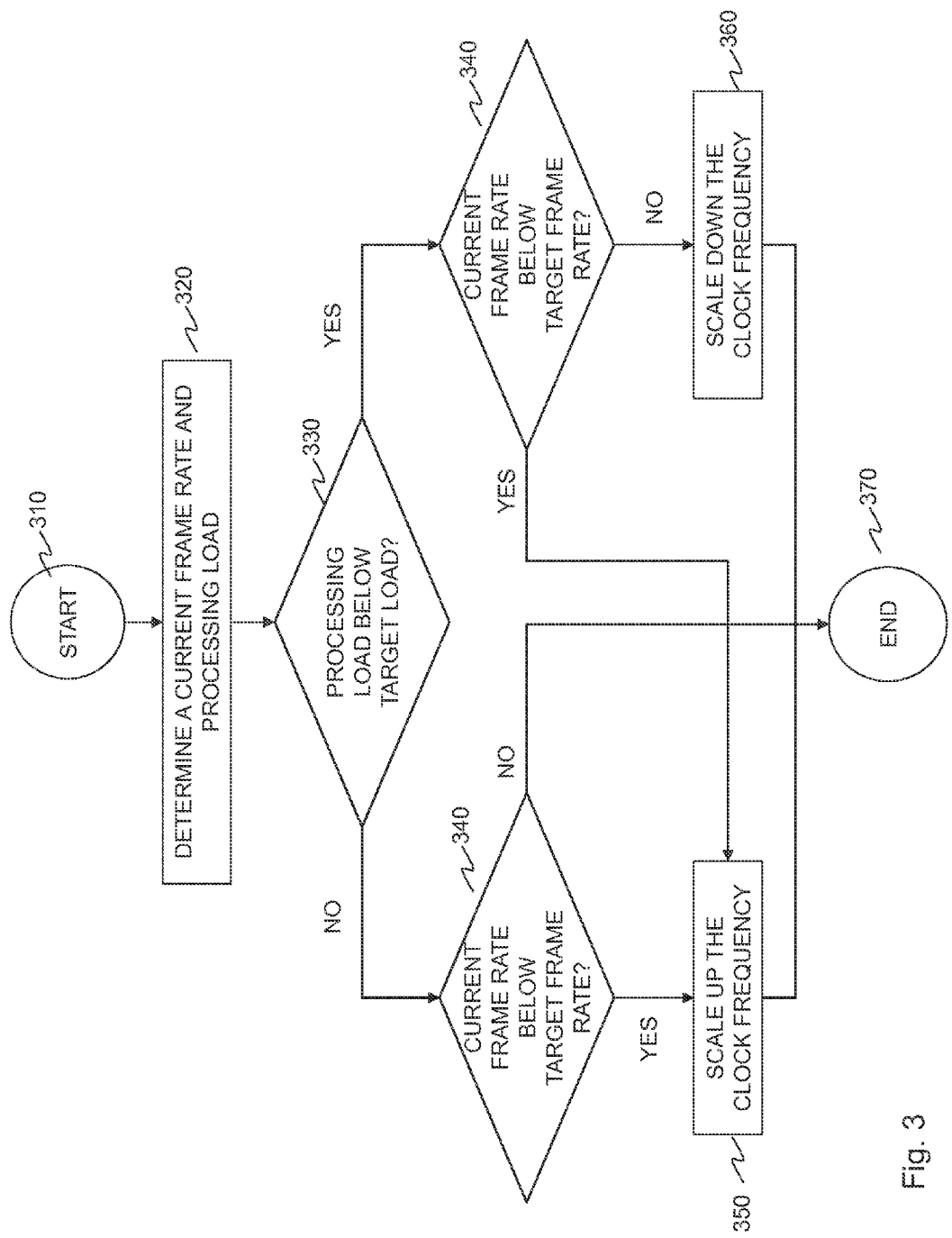
FIG. 3 is a flow diagram of one embodiment of a method of scaling clock frequency.

FIG. 3 is a flow diagram of one embodiment of a method of scaling clock frequency. The method begins in a start step 310. In a step 320 a current frame rate is determined for graphics rendered by processing a graphics application on a computing system. The computing system includes a processor having a clock and operating at a clock frequency. The processor operates under a current processing load that is also determined in step 320. The current processing load is compared to a target processing load for the processor in a step 330. A preliminary decision is made as to whether the clock frequency should be scaled up or down based on the processing load comparison. If the current processing load is below a target load, then the preliminary decision is to scale down the clock frequency. Conversely, if the current processing load is above the target load, then the preliminary decision is to scale up the clock frequency. The target load may be characterized in a variety of ways. One such way is to simply define a target percent load. Alternatively, margin can be designed into that definition and a target load band is defined. A specified target load is still used, but with a plus-or-minus tolerance associated. For example, a target loading of 100% is defined with a plus-or-minus 10% margin. If the current processing load is between 90% and 110%, then the preliminary decision would be to maintain the current clock frequency. If the processor is operating outside of that target band, then the logic above applies and the preliminary decision is to either scale up or scale down the clock frequency. Note that operating above 100% processing load simply means instructions are queuing up for the processor to execute, whereas operating below 100% processing load indicates unused clock cycles.

The graphics rendering carried out by the computing system has an associated target frame rate that is compared in a decisional step 340 to the current frame rate determined in step 320. Depending on the preliminary decision made in step 330, the comparison in step 340 directs the decision logic down a different path. If the current processing load is below the target load and the preliminary decision from step 330 is to scale down the clock frequency, and the current frame rate is below the target frame rate, the clock frequency of the clock residing in the processor is scaled up in a step 350 to increase the number of operations carried out per second. The scaling up of the step 350 allows the processor to work faster and increases the frame rate, which is the speed at which graphics are rendered. Assuming the current processing load is still below the target load, if the current frame is at or above the target frame rate, the clock frequency is scaled down in a step 360. The scaling down of the step 360 reduces the number of wasted clock cycles in the processor while still meeting the target frame rate. The reduced clock frequency, consequently, reduces the power consumption of the processor and also the cooling load of the computing system as a whole. If, however, the current processing load is at or above the target load, and the preliminary decision in step 330 is to scale up the clock frequency, then the clock frequency will either be scaled up accordingly or maintained. If the current frame rate is below the target frame rate, then the preliminary decision from step 330 to scale up the clock frequency is confirmed at the clock frequency scaled up. If the current frame rate is at or above the target frame rate, then the preliminary decision is overridden and the current clock frequency is maintained. The method ends in an end step 360.

Those skilled in the art to which this application relates will appreciate that other and further additions, deletions, substitutions and modifications may be made to the described embodiments.

What is claimed is:

1. A variable frequency processor, comprising:
   a processing core operable at a clock frequency to undertake a processing of a graphics application; and
   a clock frequency controller coupled to said processing core and operable to adjust said clock frequency based on a current frame rate of said processing, a target frame rate for said processing, a current load of said variable frequency processor, and a target load for said variable frequency processor, said clock frequency controller configured to:
   make a preliminary decision to scale down said clock frequency if said current load of said variable frequency processor is below said target load;
   make a preliminary decision to scale up said clock frequency if said current load of said variable frequency processor is above said target load;
   increase said clock frequency if said current frame rate is below said target frame rate irrespective of said preliminary decision;
   decrease said clock frequency if said current frame rate exceeds said target frame rate and said preliminary decision is to scale down said clock frequency; and
   maintain said clock frequency if said current frame rate exceeds said target frame rate and said preliminary decision is to scale up said clock frequency.

2. The variable frequency processor recited in claim 1 wherein said processor is a central processing unit.

3. The variable frequency processor recited in claim 1 wherein said graphics application generates graphics to be displayed on a display device having a refresh rate related to said target frame rate.

4. The variable frequency processor recited in claim 1 wherein said target frame rate is dependent upon said graphics application.

5. The variable frequency processor recited in claim 1 wherein said clock frequency controller is further operable to compute said current frame rate based on a weighted average of recent frame times.

6. A method of scaling a clock frequency of a processing core processing a graphics application, comprising:
  determining a current frame rate and current processor load;
  making a preliminary decision to scale down said clock frequency if said current processor load is below a target processor load;
  making a preliminary decision to scale up said clock frequency if said current processor load is above said target processor load;
  scaling up said clock frequency if said current frame rate is below a target frame rate irrespective of said preliminary decision;
  scaling down said clock frequency if said current frame rate exceeds said target frame rate and said preliminary decision is to scale down said clock frequency; and
  maintaining said clock frequency if said current frame rate exceeds said target frame rate and said preliminary decision is to scale up said clock frequency.

7. The method recited in claim 6 further comprising maintaining said clock frequency if said processing core is operating above a processing load limit and said current frame rate at least equals said target frame rate.

8. The method recited in claim 6 wherein said determining comprises determining said current frame rate based on a current frame time and a target frame time.

9. The method recited in claim 6 further comprising displaying graphics yielded by said graphics application on a display device having a refresh rate.

10. The method recited in claim 9 wherein said target frame rate is based on said refresh rate.

11. The method recited in claim 6 wherein said processing core is a central processing unit.

12. A computing system operable to execute an application for generating graphics at a target frame rate, comprising:
  a display device operable to display said graphics at a current frame rate;
  a display controller configured to determine said current frame rate; and
  a variable frequency processor coupled to said display controller and including:
    a processing core operable at a clock frequency to undertake a processing of said application, and
    a clock frequency controller associated with said processing core and operable to adjust said clock frequency based on a current frame rate of said processing, a target frame rate for said processing, a current load of said variable frequency processor, and a target load for said variable frequency processor, said clock frequency controller circuit configured to:
      make a preliminary decision to scale down said clock frequency if said current load of said variable frequency processor is below said target load;
      make a preliminary decision to scale up said clock frequency if said current load of said variable frequency processor is above said target load;
      increase said clock frequency if said current frame rate is below said target frame rate irrespective of said preliminary decision;
      decrease said clock frequency if said current frame rate exceeds said target frame rate and said preliminary decision is to scale down said clock frequency; and
      maintain said clock frequency if said current frame rate exceeds said target frame rate and said preliminary decision is to scale up said clock frequency.

13. The computing system recited in claim 12 wherein said variable frequency processor is a central processing unit.

14. The computing system recited in claim 12 wherein said clock frequency controller is further operable to compute said current frame rate based on a weighted average of recent frame times.

15. The computing system recited in claim 12 wherein said display controller is further operable to compute said current frame rate based on a weighted average of recent frame times.

* * * * *